(12) United States Patent
Davis et al.

(10) Patent No.: US 6,778,362 B1
(45) Date of Patent: Aug. 17, 2004

(54) HINGED LOAD BEAM WITH TORSIONAL SPRING

(75) Inventors: Michael W. Davis, Rockford, MN (US); Jacob D. Bjorstrom, Waconia, MN (US)

(73) Assignee: Hutchinson Technology, Inc., Hutchinson, MN (US)

( * ) Notice: Subject to any disclaimer, the term of this patent is extended or adjusted under 35 U.S.C. 154(b) by 121 days.

(21) Appl. No.: 10/231,772

(22) Filed: Aug. 29, 2002

Related U.S. Application Data
(60) Provisional application No. 60/316,505, filed on Aug. 31, 2001.

(51) Int. Cl.$^7$ ................................................ G11B 5/48
(52) U.S. Cl. ................................. 360/244.8; 360/244.5; 360/244.9
(58) Field of Search ........................... 360/244.2, 244.5, 360/244.9, 244.8

(56) References Cited

U.S. PATENT DOCUMENTS

| | | | | |
|---|---|---|---|---|
| 4,189,759 A | | 2/1980 | Bauck et al. ............. | 360/244.9 |
| 4,399,476 A | | 8/1983 | King ....................... | 360/245.5 |
| 5,012,369 A | * | 4/1991 | Owe et al. ............... | 360/294.7 |
| 5,734,525 A | | 3/1998 | Girard ..................... | 360/244.8 |
| 5,796,554 A | | 8/1998 | Berding et al. ........... | 360/244.8 |
| 5,850,319 A | | 12/1998 | Tangren ................... | 360/244.8 |
| 5,870,252 A | * | 2/1999 | Hanrahan ................. | 360/244.8 |
| 5,914,835 A | | 6/1999 | Girard et al. ............. | 360/244.9 |
| 5,936,803 A | * | 8/1999 | Berding .................... | 360/244.8 |
| 6,233,124 B1 | * | 5/2001 | Budde et al. ............ | 360/294.4 |
| 6,307,715 B1 | * | 10/2001 | Berding et al. .......... | 360/244.8 |
| 6,515,834 B1 | * | 2/2003 | Murphy .................... | 360/294.4 |
| 6,522,050 B2 | * | 2/2003 | Sivadasan et al. .......... | 310/328 |
| 6,680,826 B2 | * | 1/2004 | Shiraishi et al. ......... | 360/294.4 |
| 2001/0043443 A1 | * | 11/2001 | Okamoto et al. ........... | 360/294 |
| 2002/0044385 A1 | * | 4/2002 | Murphy .................... | 360/244.8 |

FOREIGN PATENT DOCUMENTS

| | | | |
|---|---|---|---|
| JP | 59-213066 | | 12/1984 |
| JP | 60-136979 | | 7/1985 |
| JP | 1-292683 | | 11/1989 |
| JP | 5-43356 | | 6/1993 |
| JP | 5-135529 | | 6/1993 |
| JP | 7-225981 | | 8/1995 |
| JP | 10-3757 | | 1/1998 |
| JP | 10-92131 | | 4/1998 |
| JP | 2002-50140 A | * | 2/2002 |
| JP | 2002-184142 A | * | 6/2002 |

\* cited by examiner

Primary Examiner—Jefferson Evans
(74) Attorney, Agent, or Firm—Faegre & Benson LLP

(57) ABSTRACT

A head suspension assembly for a rigid disk drive. The head suspension has a load beam with a mounting region at a proximal end, a rigid region at a distal end and a tether connecting the mounting region and the rigid region. A hinge structure is located between the rigid region and the mounting region. The hinge structure comprises an interface with first pivot surfaces on the mounting region positively engaged with second pivot surfaces on the rigid region by the tether. A torsional spring is located between the rigid region and the mounting region.

29 Claims, 11 Drawing Sheets

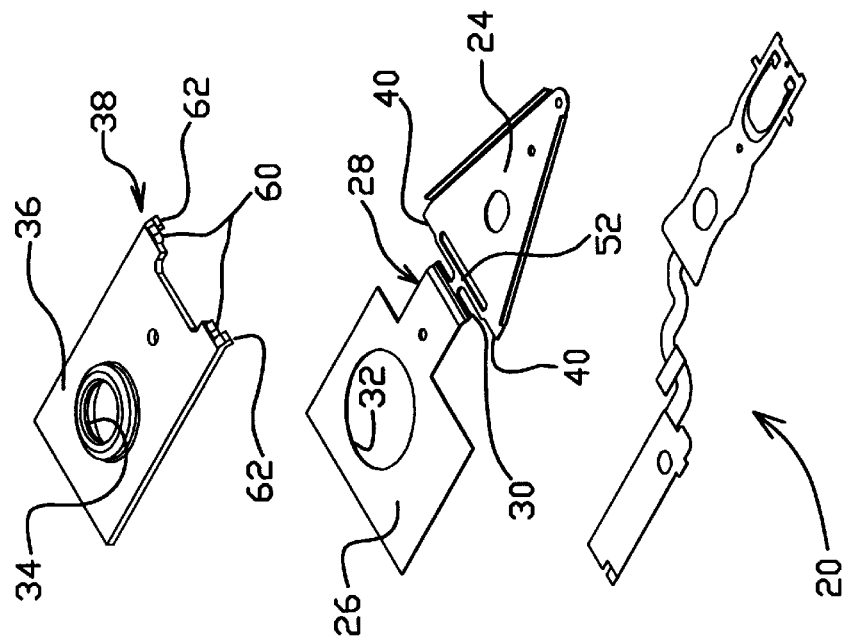
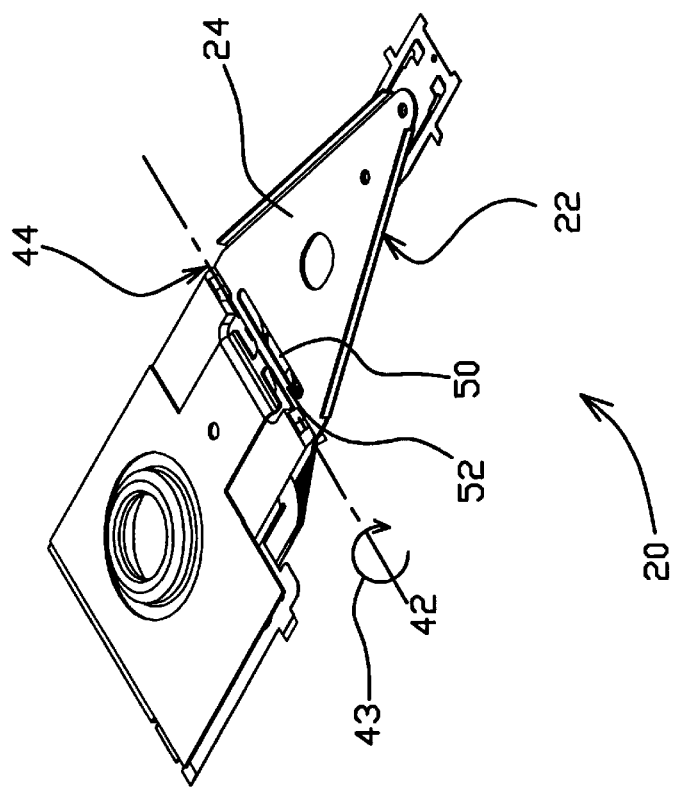
FIG. 1A
FIG. 1B

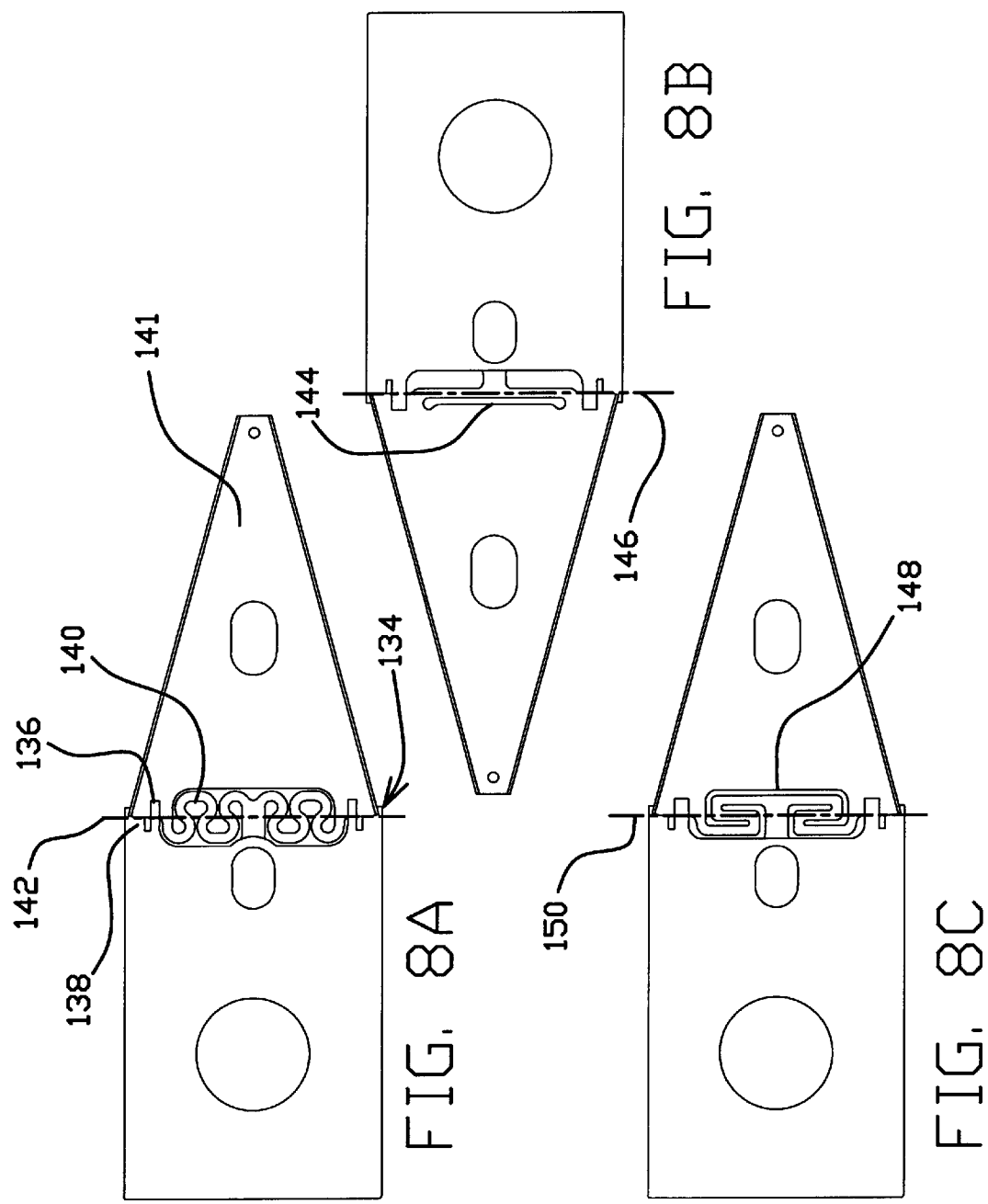

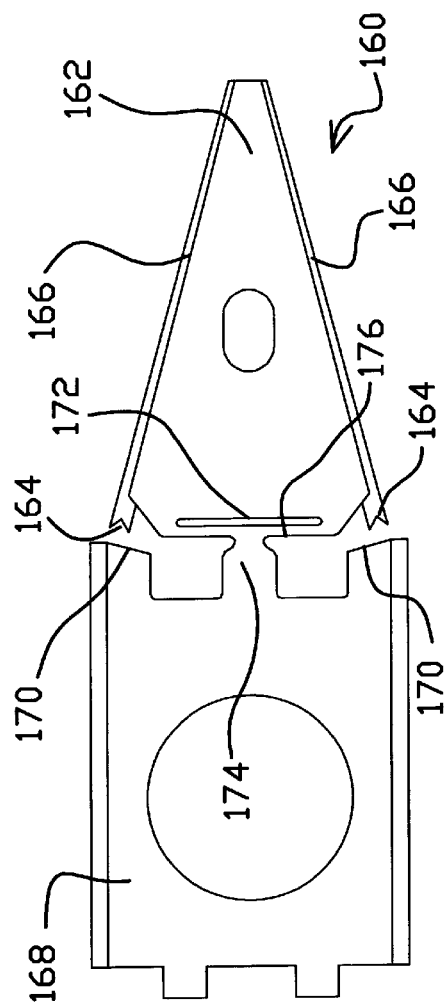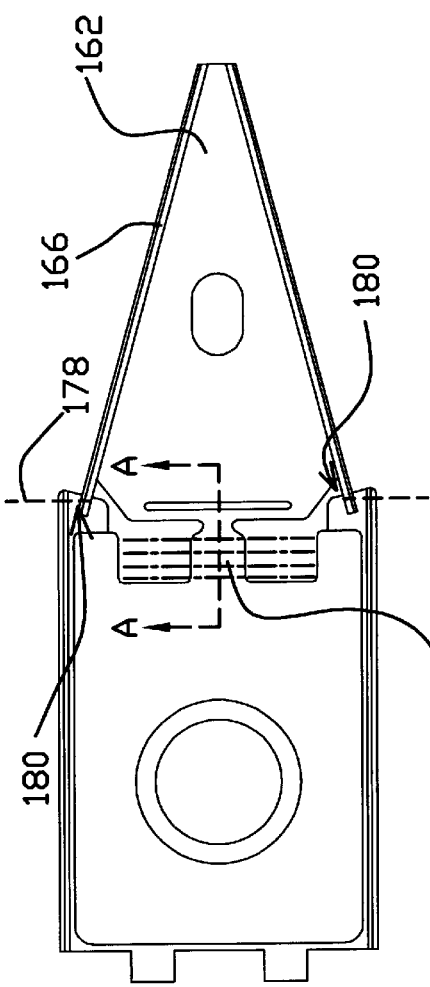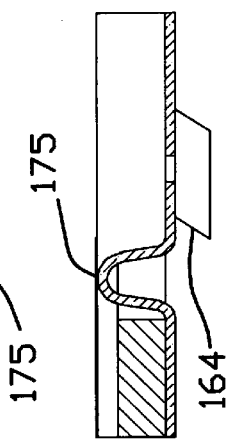
FIG. 9A
FIG. 9B
FIG. 9C

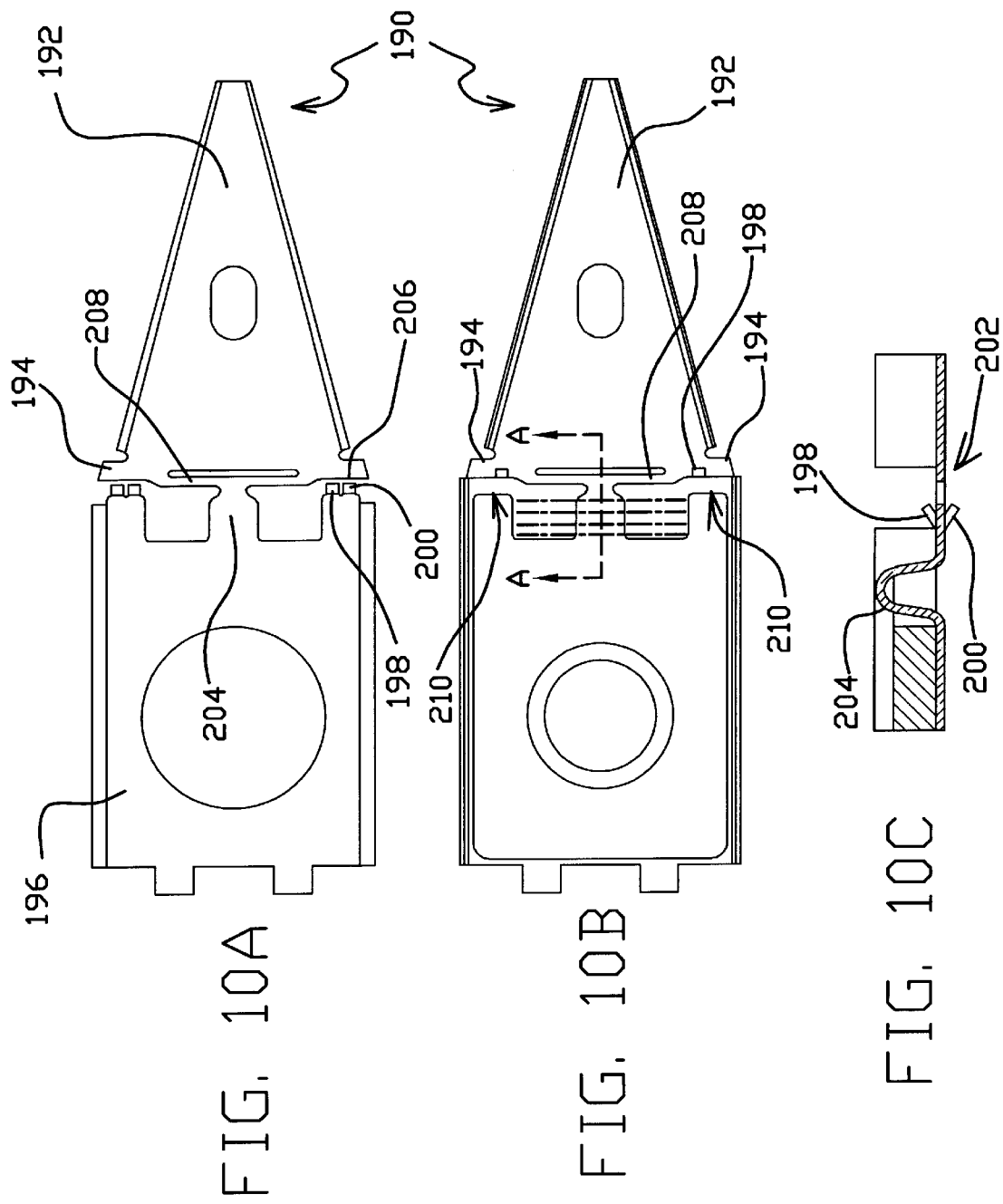

HINGED LOAD BEAM WITH TORSIONAL SPRING

REFERENCE TO RELATED APPLICATION

This application claims the benefit of U.S. Provisional Application Serial No. 60/316,505 filed Aug. 31, 2001, which is hereby incorporated by reference in its entirety.

FIELD OF THE INVENTION

The present invention is directed to a head suspension assembly having a torsion spring in a spring region and a hinge structure held in positive engagement by a tether.

BACKGROUND OF THE INVENTION

Information storage devices typically include a head for reading and/or writing data onto a storage medium such as a magnetic disk within a rigid disk drive. An actuator mechanism is used to position the head at specific lateral locations or tracks on the magnetic disk. Both linear and rotary type actuators are well known in the art. Between the actuator and the head, a head suspension is required to support the head in proper orientation relative to the disk surface.

The head suspension carries the read/write head so that the head can "fly" over the surface of the rigid disk while the disk is spinning. The head is typically located on a head slider having an aerodynamic design so that the head slider flies on an air bearing generated by the spinning disk. The combination of the head slider and the head suspension is referred to as a head suspension assembly. The head suspension includes a load beam having a radius or spring section and a rigid section. A spring or gimballing connection is typically included between the head slider and the rigid section of the load beam so that the head slider can move in the pitch and roll directions of the head to accommodate fluctuations of the disk surface. Such a spring connection can be provided by a gimbal that can be either a separate component connected to the rigid region of the load beam or integrally manufactured at the end of the load beam.

Typically, the spring section of the load beam includes a formed bend or radius. This radius provides the spring or load force and thus a desired load to the head slider for a predetermined offset height, the offset height being a measurement of the distance between the mounting height of the head suspension to the actuator and the head slider at "fly" height.

The spring force provided by the spring region obeys a simple Hooke's law relation. That is, the load force the spring region exerts on the head slider toward the disk is directly proportional to the distance the head slider has been deflected away from the disk by the force created by the air bearing; the greater the deflection, the greater the opposing force, and the less the deflection, the lower the opposing force. The constant of proportionality between the distance the head slider has been deflected and the load force is the spring constant of the load beam.

As this discussion makes clear, the fly height of the head slider above the disk is a balance of the lifting force and the opposing load force. Thus, the load force is one factor that directly determines the height at which the head moves over the disk. This height is critical to high speed, accurate storage and retrieval of data. Further, the industry is constantly pushing the upper limit of the density of information that can be stored on disk drives. The density of information which a head can write to or read from a disk is proportional to the height of the head over the disk. Thus, it is desirable to control the fly height of the head over the disk as precisely as possible while preventing contact between the head and the disk.

However, disk drive manufacturing processes can make fly height control difficult to realize. Handling of the head suspension after production may change the bend or radius thereby altering load force characteristics causing "load loss."

Because of the direct relation between load force and fly height, load loss or spacing variations can impact fly height. One way to minimize the problem is to effectively make the spring region of the load beam more pliable. As noted above, the constant of proportionality between the deflection of the head slider and the opposing load force exerted by the spring region of the load beam is the load beam+s spring constant. It follows that the lower this spring constant, the less effect a change in deflection will have on load force. Thus, lowering the spring constant of the spring region of the load beam acts to minimize the effects of load loss or spacing variation on fly height.

The prior art reveals various methods of lowering the load beam spring constant, such as disclosed in U.S. Pat. No. 5,734,525 (Girard). One method is to elongate the spring region, another is to thin the material from which the spring region is manufactured. A third way is to reduce the thickness of a narrow strip of the spring region thereby effectively creating a hinge about which the load beam may rotate in a direction normal to the load beam.

However, these methods of reducing the load beam spring rate often have other consequences. In addition to providing the aforementioned spring force, the load beam must also provide the rigid link between the disk drive actuator and the head slider/head assembly for precisely positioning the head relative to data tracks on the disk surface. Lowering the spring rate of the load beam using one of the methods enumerated above can affect the load beam's ability to provide such a rigid link.

Specifically, lowering spring rate as above can increase the head suspension's vulnerability to high vibration frequencies, which can cause off-track error. This effect is particularly acute at resonance frequencies of the suspension assembly. Thus, it is important to design a suspension assembly so that either its resonance frequencies are higher than the frequencies experienced in the drive environment or the gain (movement of the suspension assembly at the head slider) at resonance frequencies is minimized.

Of most concern in the design of suspension assemblies are the resonance frequencies of the torsional modes and lateral bending (or sway) modes. These modes can result in lateral movement of the head slider at the end of the head suspension assembly and are dependent on cross-sectional properties along the length of the load beam. Torsional modes sometimes produce a mode shape in which the tip of the resonating suspension assembly moves in a circular fashion. However, since the head slider is maintained in a direction perpendicular to the plane of the disk surface by the stiffness of the applied spring force acting against the air bearing, only lateral motion of the rotation is seen at the head slider. The sway mode is primarily lateral motion.

Typically, there are two torsional mode resonant frequencies, which occur below the first sway mode resonant frequency. Various techniques well known in the art are used to design head suspensions so that these first two torsion modes have a minimal effect on read/write performance.

The resonance frequency of the sway mode is normally designed to be higher than the frequencies that are experienced by the load beams in the disk drives within which they are used. However, the techniques described above which can be used to lower load beam spring rate can also reduce the lateral stiffness of the load beam. This has the effect of lowering the sway mode resonant frequency, in some cases to a point below the second torsional mode resonant frequency. If sway gain is high and if a sway resonant frequency is within frequencies that may be experienced in the disk drive, off track error could occur.

BRIEF SUMMARY OF THE INVENTION

The present invention is directed to a head suspension assembly with a hinge structure that de-couples frequency response from the spring rate. The hinge structure also minimizes the change in beam profile relative to z-height. A torsional spring provides a low gram and low spring rate without sacrificing frequency response.

The head suspension has a load beam with a mounting region at a proximal end, a rigid region at a distal end and a tether connecting the mounting region and the rigid region. A hinge structure is located between the rigid region and the mounting region. The hinge structure comprises an interface with first pivot surfaces on the mounting region positively engaged with second pivot surfaces on the rigid region by the tether. A torsional spring is located between the rigid region and the mounting region. The mounting region, rigid region and tether can be a single, continuous piece of material or separate components.

The torsional spring can have a nested configuration, a linear configuration or a serpentine configuration. The hinge structure preferably includes an axis of rotation adjacent to the torsional spring. In one embodiment, the axis of rotation extends through the operating region of the torsional spring. The torsional spring supplies gram load and distributes the stress of loading caused by offset heights generally around the pivot axis of the hinge structure. The stresses are preferably distributed over the entire length of the torsional spring. The tether does not appreciably effect gram load, but rather acts substantially independent of the torsional spring.

The tether can be a separate component or part of the material comprising the mounting region and/or rigid region. One or more bends can be formed in the tether to shorten its effective length and to generate a biasing force between the first and second pivot surfaces. In one embodiment, the tether comprises a member mechanically coupling the mounting region to the rigid region. The tether and the torsional spring can be separate components or can be formed from the same piece of material.

The hinge structure typically comprises a pair of upper tabs and a pair of lower tabs on the mounting region. Alternatively, the upper and lower tabs can be located in the rigid region. In another embodiment, the hinge structure comprises a notch in rails on the rigid region. In another hinge structure, the first pivot surface comprises a horizontal edge on the mounting region and the second pivot surface comprises a vertical edge with a notch on the rigid region.

The present invention can be incorporated into many different types of suspension styles, while still maintaining the pivot axis close to the axis of the torsional spring, including thin beam suspensions, thick beam suspensions, laminate suspensions, hybrid suspensions.

In thin beam suspensions, the hinge structure can be integral with the thin beam or can be a separate piece. Thin beam suspensions are typically constructed from material having a thickness of about 0.0025 inches or less. In thick beam head suspensions, the hinge structure can either be a separate piece or integral with the load beam.

In hybrid head suspensions, both thin and thick beam materials may be used. The hinge structure in a hybrid head suspension can be made from the head suspension material with a stiffener added or can be a separate component. The hinge structure can also be part of the base plate. In laminate head suspensions, the hinge structure can be made from one of the skins of the laminated structure. In another laminate embodiment, a living hinge with an integral torsional spring is provided in a multi-piece head suspension assembly. Various aspects of the torsional spring and/or hinge structure can optionally be part of the base plate.

BRIEF DESCRIPTION OF THE SEVERAL VIEWS OF THE DRAWING

FIG. 1A illustrates a perspective view of a head suspension assembly with a hinge structure in accordance with the present invention.

FIG. 1B illustrates an exploded view of the head suspension assembly of FIG. 1A.

FIGS. 8A–8C illustrates various torsional springs in accordance with the present invention.

FIG. 9A illustrates a blank for forming a head suspension assembly in accordance with the present invention.

FIG. 9B illustrates an alternate head suspension assembly formed from the blank of FIG. 9A in accordance with the present invention.

FIG. 9C illustrates a sectional view taken through a portion of the head suspension of FIG. 9B.

FIG. 10A illustrates a blank for forming a head suspension assembly in accordance with the present invention.

FIG. 10B illustrates an alternate head suspension assembly formed from the blank of FIG. 10A in accordance with the present invention.

FIG. 10C illustrates a sectional view taken through a portion of the head suspension of FIG. 10B.

DETAILED DESCRIPTION OF THE INVENTION

Figure 2:
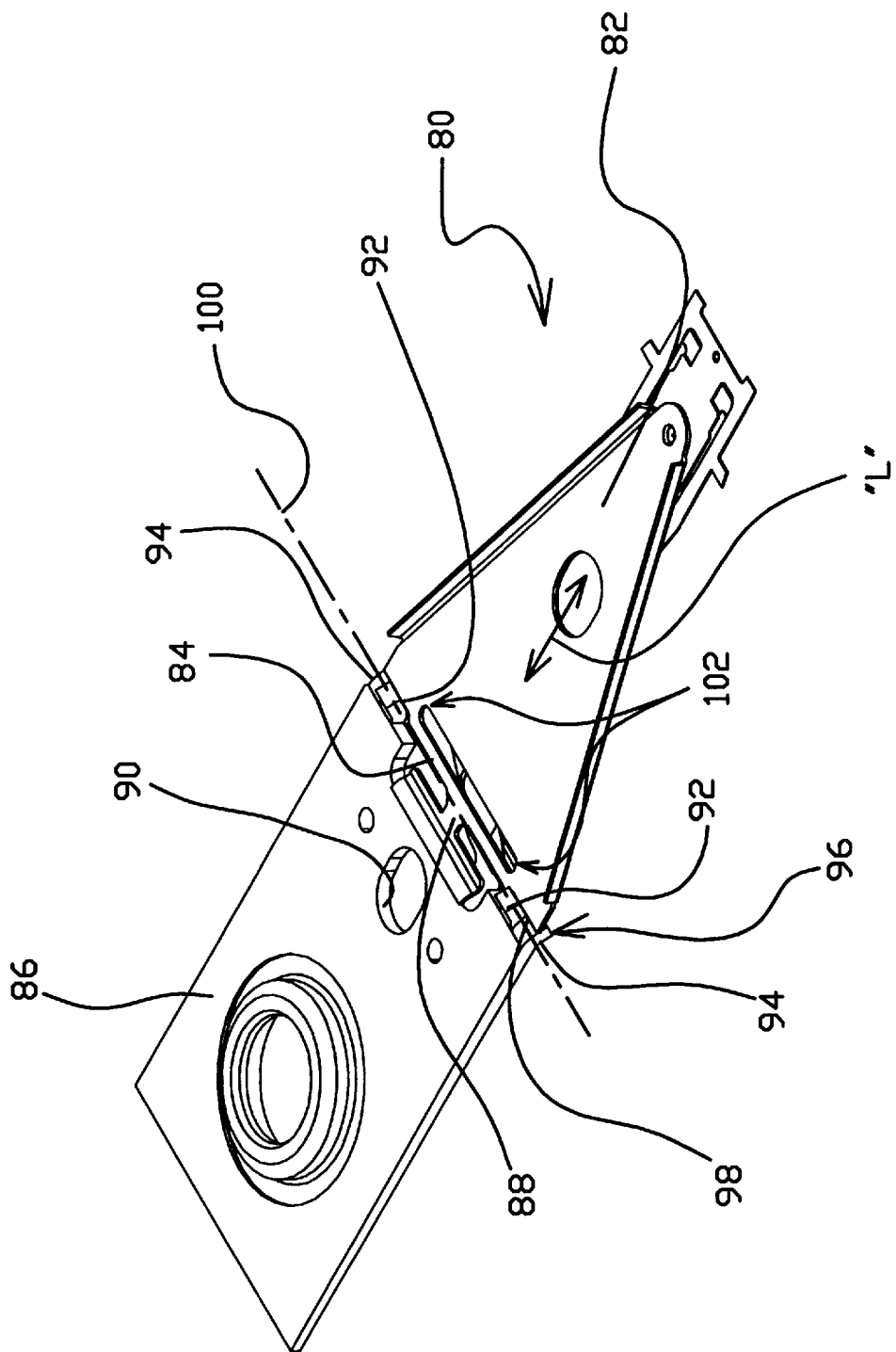
FIG. 2 illustrates an alternate head suspension assembly with a hinge structure in accordance with the present invention.
Figure 3:
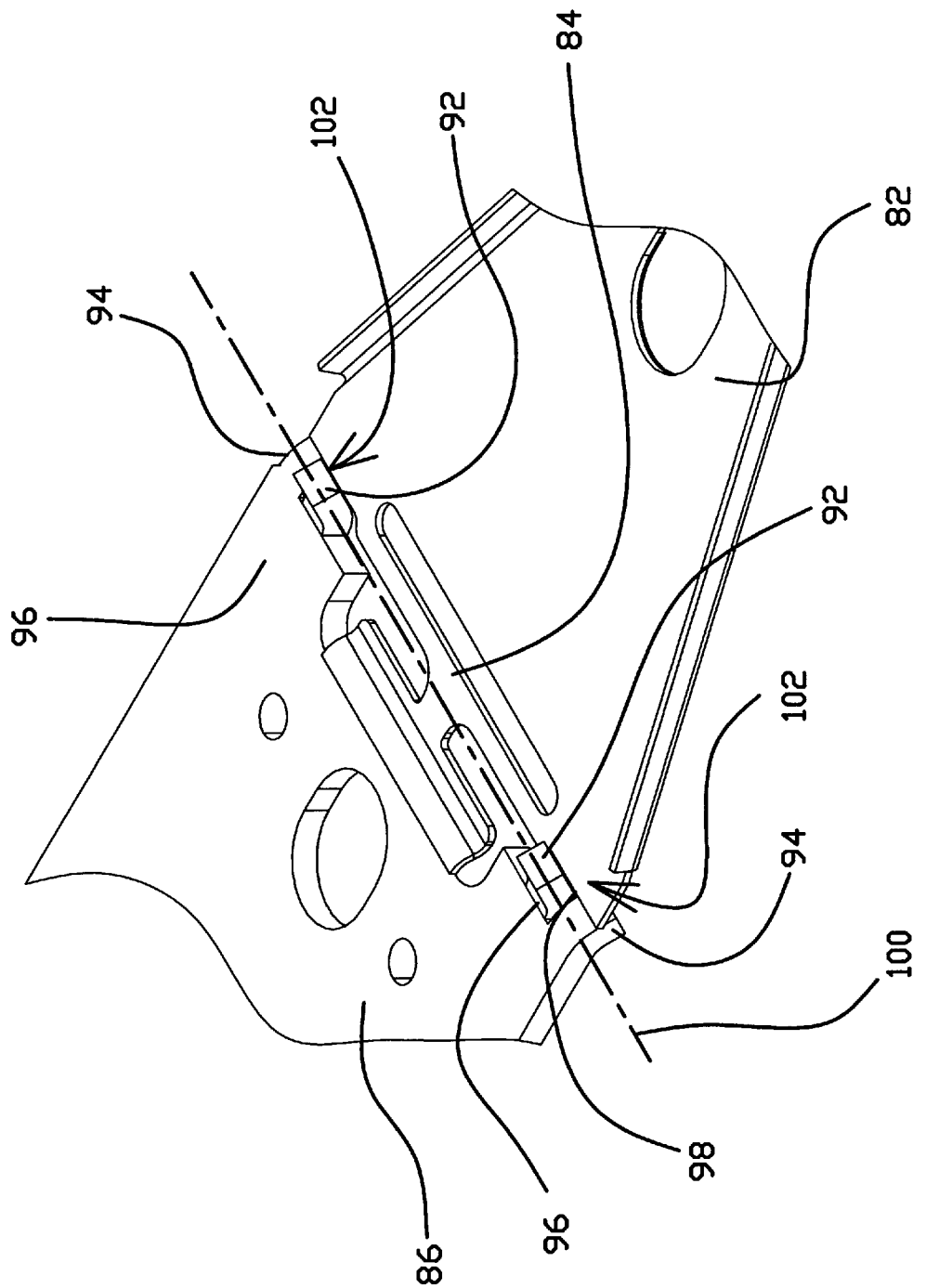
FIGS. 3 and 4 are enlarged views of the hinge structure of FIG. 2.
Figure 4:
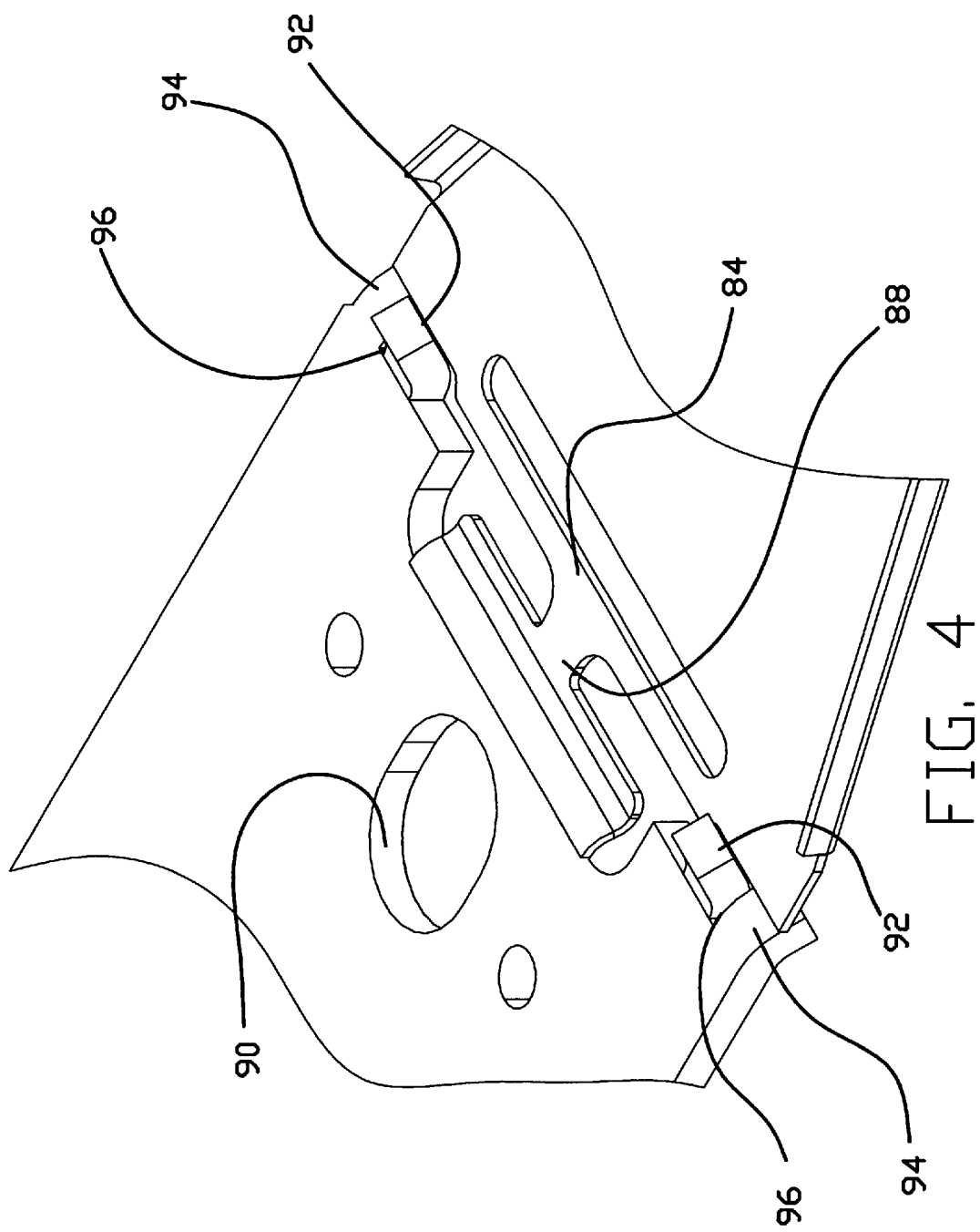
Figure 5:
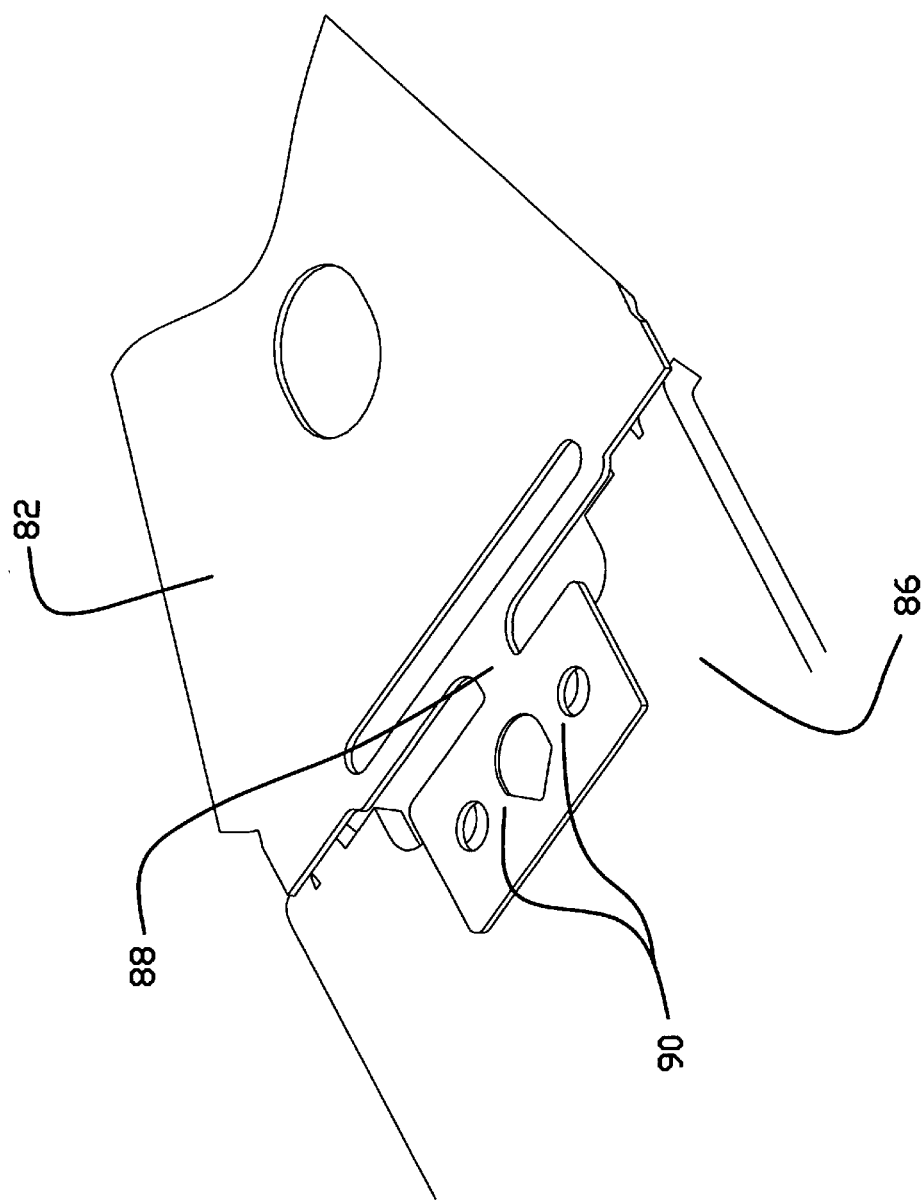
FIG. 5 is a bottom view of the hinge structure of FIG. 2.

FIGS. 1A and 1B illustrate an assembly view and an exploded view of a head suspension assembly 20 in accordance with the present invention. Load beam 22 includes a rigid region 24, a mounting region 26, and a spring region 28. Tether 30 connects the mounting region 26 to the spring region 28. In the illustrated embodiment, mounting region 26 includes a mounting hole 32 that corresponds with a boss tower 34 on base plate 36. In one embodiment, the tether 30, the mounting region 26 and the rigid region 24 are made from a single, continuous piece of material. Alternatively, the tether 30 can be a separate component that is attached to the mounting region 26 and/or the rigid region 24 using adhesives, welding, fasteners, interconnecting features, or combinations thereof Suitable adhesives include pressure sensitive adhesives, thermosetting or thermoplastic adhesives, radiation cured adhesives, adhesives activated by solvents, and combinations thereof.

Base plate 36 includes a pair of upper tabs 60 and a pair of lower tabs 62 forming first pivot surfaces 38. The first pivot surfaces 38 are positioned to engage with second pivot surfaces 40 located near the spring region 28 of the load beam 22. The interface of the first pivot surfaces 38 with the second pivot surfaces 40 permit the rigid region 24 to flex or rotate around pivot axis 42 of hinge structure 44. In the loaded state, there are contact reaction forces created by tether 30 that bias the first pivot surface 38 against the second pivot surface 40. As used herein, "hinge structure" refers to two discrete surfaces that are biased against each other in a pivoting relationship. The two discrete surfaces can be located on two discrete pieces of material or on two unconnected sections of the same piece of material.

In the illustrated embodiment, the spring region 28 is located between the pivot axis 42 and the mounting region 26. That is, operation of the spring region 28 is isolated behind the operation of the hinge structure 44. Alternatively, the spring region 28 can be located between the pivot axis 42 and the rigid region 24.

In the embodiment of FIGS. 1A and 1B, the hinge structure 44 creates a straight line of contact along axis 42 between the load beam 22 and the base plate 36 about which the rigid region 24 can pivot when lifted from a free state to an offset state. The present torsional hinge 44 provides low rotational friction with high torsional or translational friction. The torsional spring 28 is not effected by the operation of the hinge structure 44, effectively de-coupling the spring rate from the suspension's natural frequency performance. The hinge structure 44 is preferably located along the outside edges of the head suspension assembly 20 so as to provide the greatest resistance to torsional forces on the rigid region 24.

The embodiment illustrated in FIGS. 1A and 1B allows for high torsional frequencies and high sway frequencies, while keeping the spring rate relatively low. By isolating the spring region 28 behind the pivot axis 42 of the hinge 44, the spring rate can be varied without significantly affecting the natural frequency of the load beam 22. In some embodiments, the present head suspension assembly 20 may provide lower load loss where the spring region 28 is designed for low stress.

The spring region 28 includes a torsional spring 52 with a laterally extending cutout 50. Torsional force 43, typically caused by z-axis displacement of the rigid region 24, acts generally around the pivot axis 42. This geometry provides high torsional frequencies and high sway frequencies. Additionally, the geometry of the torsional spring 52 distributes stress generally along the pivot axis 42. As used herein, "torsional spring" refers to a structure in which torsional forces act generally around a pivot axis of a hinge structure connecting a rigid region to a mounting region.

FIGS. 2 through 5 illustrate various aspects of an alternate head suspension assembly 80 in accordance with the present invention. Rigid region 82 includes a torsional spring 84 coupled to base plate 86 by tether 88. The tether 88 includes a mounting portion 90 that couples to the base plate 86. The tether 88 acts along longitudinal axis "L" while the torsional spring 84 acts generally around pivot axis 100. The tether 88 preferably isolates the hinge structure 102 bearing preload from the gram force and offset height attributes of the head suspension assembly 80 via the torsional spring 84 acting along the pivot axis 100. The hinge structure 102 bearing preload is not affected in changes in suspension Z-height. This configuration maintains an almost purely torsional loading of the torsional spring 84. Consequently, the gram load provided by torsional spring 84 is de-coupled from the connecting function of the tether 88.

The base plate 86 includes a pair of upper tabs 92 and a pair of lower tabs 94 which form a V-shaped pivot surface 96 adapted to receive trailing edge 98 of the rigid region 82. The rigid region 82 can pivot around pivot axis 100 on hinge structure 102 within the limit provided by the upper and lower tabs 92, 94. In one embodiment, the upper tabs 92, the lower tabs 94 and the trailing edge 98 are coated with a polymeric material to reduce friction and/or to reduce particle generation often encountered with steel components rubbing on other steel components.

In yet another embodiment, reference numeral 86 is a plastic component that is attached to a base plate (not shown). This embodiment eliminates the need to form the tabs 92, 94 on the base plate. The component 86 can form a snap-fit relationship with the base plate or can be molded directly onto the base plate. The trailing edge 98 of the rigid region 82 is optionally coated with a polymeric material so that the hinge structure 102 is a plastic-on-plastic interface. The plastic-on-plastic interface reduces particle generation often encountered with steel rubbing on steel. Forming the component 86 from plastic also permits the upper tabs 92 to be located directly above the lower tabs 94.

Figure 6B:
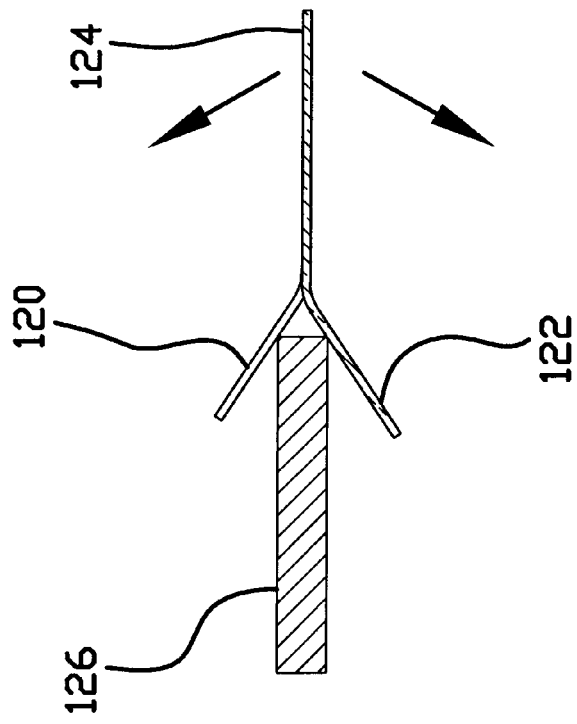
FIG. 6B illustrates an embodiment of a hinge structure located on a load beam in accordance with the present invention.
Figure 6A:
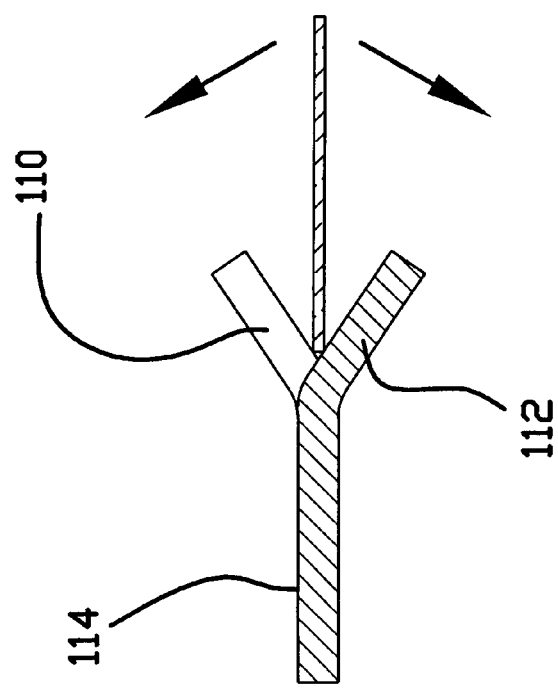
FIG. 6A illustrates an embodiment of a hinge structure located on the base plate in accordance with the present invention.

FIGS. 6A and 6B illustrate that it may be possible to form hinge tabs on either side of the spring region, reducing the complexity of the base plate. In the embodiment of FIG. 6A, upper and lower hinge tabs 110, 112 are formed in the base plate 114. In the embodiment of FIG. 6B, upper and lower hinge tabs 120, 122 are formed in rigid region 124. The tabs 120, 122 engage with base plate 126 as discussed above. In some embodiments, in may be desirable to form a chamfer or rounded edge on the base plate 126 to minimize over-pivoting of the rigid region 124 relative to the base plate 126. It may also be desirable for some applications to coat the mating components of the hinge with a polymeric material that reduces friction and/or reduces particle generation.

Figure 7A:
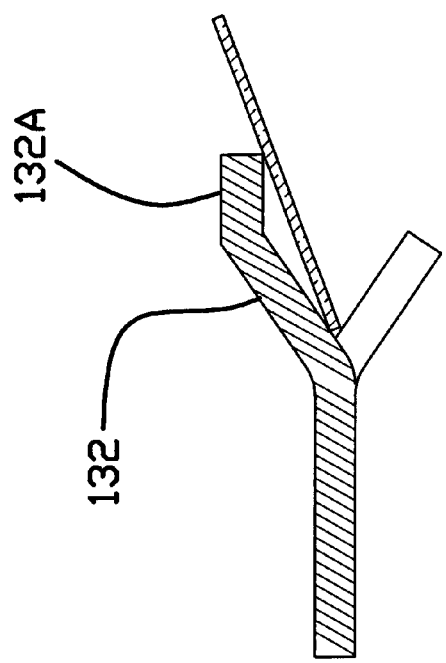
FIG. 7A is a side view of a free state limiting extension incorporated in a lower portion of a hinge structure of the present invention.
Figure 7B:
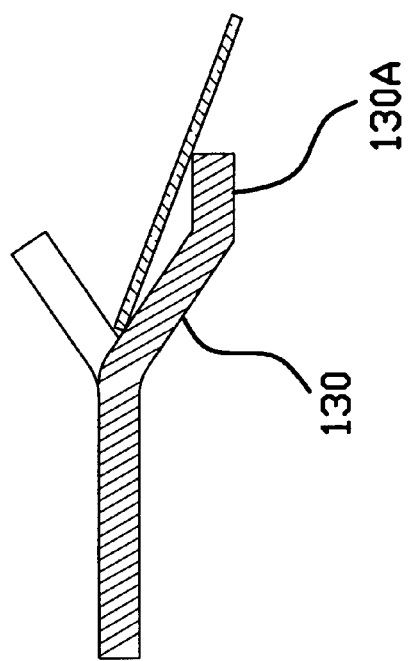
FIG. 7B is a side view of a shock deflection limiting extension incorporated in an upper portion of a hinge structure of the present invention.

FIGS. 7A and 7B illustrate that it may be possible to utilize hinge tabs for other functions. For example, lower hinge tab 130 includes an extension 130A, so that the lower hinge tab 130 can operate as a free state limiter. Alternatively, upper hinge tab 132 includes an extension 132A, so that the upper hinge tab 132 can operate as a shock deflection limiter. Although the extensions 130A, 132A are illustrated as being generally horizontal, they can be oriented at any angle.

As illustrated in FIGS. 8A–8C, the torsional spring of the present invention can take a variety of shapes. In each of the embodiments of FIGS. 8A–8C, hinge structure 134 comprises a pair of upper tabs 136 and lower tabs 138, although other hinge structures can be used. In the embodiment of FIG. 8A, torsional spring 140 comprises a serpentine configuration. The torsional spring 140 is preferably centered along pivot axis 142. Displacement of rigid region 141 causes the torsional spring 140 to generate a spring force that acts primarily around pivot axis 142, although a non-torsional spring force component may also be present. In the embodiment of FIG. 8B, torsional spring 144 includes a longitudinal slit that is positioned adjacent to pivot axis 146. In the embodiment of FIG. 8C, torsional spring 148 comprises a nested configuration, also centered around pivot axis 150.

The serpentine and nested configurations of FIGS. 8A–8C provide a much lower spring rate due to the longer effective length, while maintaining an effective twisting axis proximate to the pivot axis of the hinge structure, although these embodiments may provide a spring force with a non-torsional component.

FIG. 9A illustrates a blank for forming a suspension assembly 160 in which hinge structure 180 and torsional spring 172 are formed from the same piece of material in accordance with the present invention. Rigid region 162 is etched to have a pair of notches 164 formed in proximal ends of rails 166. Mounting region 168 includes a first pivot surface 170 opposite the notches 164. Spring region 172 includes a tether 174 that holds the rigid region 162 to the mounting region 168, and a torsional spring 176.

The head suspension assembly 160 is formed from the blank of FIG. 9A as illustrated in FIGS. 9B and 9C. The rails 166 are bent approximately 90 degrees so that notches 164 comprising second pivot surfaces engage with the first pivot surfaces 170 on the mounting region 168 to form hinge structure 180. The tether 174 includes one or more bends 175 that shorten its effective length and compress the notches 164 against the first pivot surface 170, maintaining hinge contact at all times, generally along axis 178. Hinge structure 180 provides high torsional frequencies and high sway frequencies, while the torsional spring 176 provides a low spring rate.

FIG. 10A illustrates an alternate blank for a head suspension 190 in which rigid region 192 includes a pair of lateral extensions 194. The lateral extensions 194 can be formed using a variety of techniques, such as etching. The head suspension 190 is formed as shown in FIGS. 10B and 10C. Mounting region 196 has a pair of upper tabs 198 and lower tabs 200 (see e.g., FIG. 3) forming a V-shaped first pivot surface 202. Tether 204 connecting the rigid region 192 to the mounting region 196 is shaped to bias the first pivot surface 202 formed by the tabs 198, 200 against second pivot surface 206 on the lateral extensions 194 in hinge structure 210. Torsional spring 208 is substantially as shown in FIG. 9B.

Figures 11A, 11B, 11C:
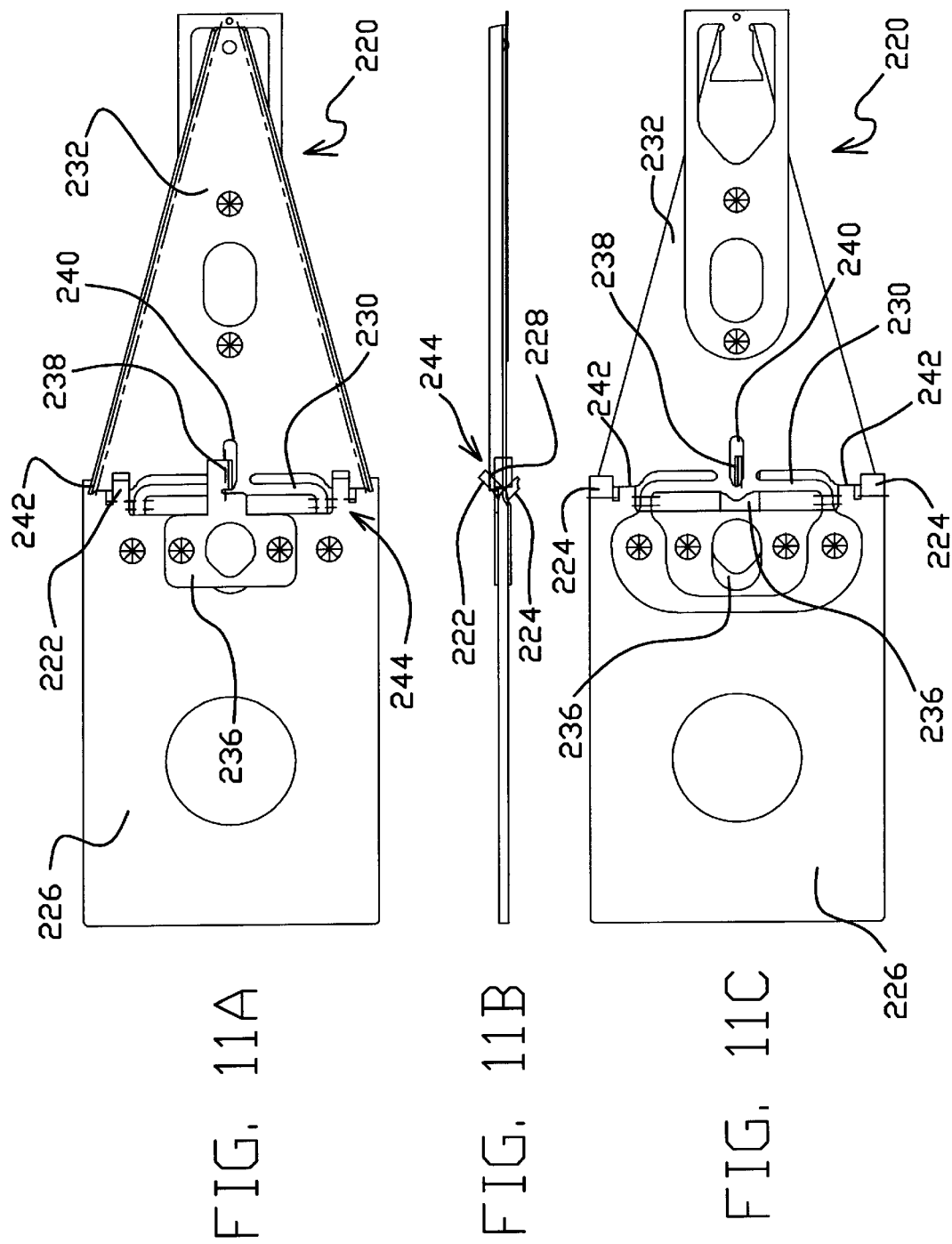
FIG. 11A illustrates a top view of a head suspension assembly with a mechanical tether in accordance with the present invention.
FIG. 11B illustrates a side view of the head suspension assembly of FIG. 11A.
FIG. 11C illustrates a bottom view of the head suspension assembly of FIG. 11A.

FIGS. 11A–11C illustrate a top, a side and a bottom views of an alternate head suspension assembly 220 in accordance with the present invention. A pair of upper tabs 222 and lower tabs 224 on the mounting region 226 form first pivot surface 228. Torsional spring 230 is formed from the material comprising rigid region 232. The torsional spring 230 is spot welded to the bottom of mounting region 226. Tether 236 comprises a separate component that is spot welded to the mounting region 226. The tether 236 includes a member 238 that mechanically engages with aperture 240 in the rigid region 232. When the member 238 is engaged with the aperture 240, second pivot surface 242 on the rigid region 232 is positively engaged with the first pivot surfaces 228 to form hinge structure 244. Alternatively, the tether 236 can be reversed so that the member 238 engages with an aperture in the mounting region 226.

All patents and patent applications disclosed herein, including those disclosed in the background of the invention, are hereby incorporated by reference. Although the present invention has been described with reference to preferred embodiments, workers skilled in the art will recognize that changes may be made in form and detail without departing from the spirit and scope of the invention. In addition, the invention is not to be taken as limited to all of the details thereof as modifications and variations thereof may be made without departing from the spirit or scope of the invention.

What is claimed is:

1. A head suspension assembly for a rigid disk drive comprising:
   a load beam having a mounting region at a proximal end, a rigid region at a distal end;
   a torsional spring located between the rigid region and the mounting region;
   a base plate attached to the mounting region of the load beam and adapted to attach the mounting region to an actuator arm;
   a tether connecting the mounting region and the rigid region of the load beam; and
   a hinge structure located between the rigid region and the base plate, the hinge structure comprising an interface with first pivot surfaces on the mounting region positively engaged with second pivot surfaces on the rigid region by the tether.

2. The head suspension of claim 1 wherein the load beam and the tether comprise a single, continuous piece of material.

3. The head suspension of claim 1 wherein the mounting region and the rigid region are separate pieces of material.

4. The head suspension of claim 1 wherein the first pivot surfaces are located on the base plate.

5. The head suspension of claim 1 wherein the first pivot surfaces are located on a plastic component attached to the base plate.

6. The head suspension of claim 1 wherein the hinge structure comprises a pair of upper tabs and a pair of lower tabs on the base plate.

7. The head suspension of claim 1 wherein the first pivot surface comprises a general "V" shape.

8. The head suspension of claim 1 wherein the first pivot surface comprises at least one lower tab with an extension that operates as a free state limiter.

9. The head suspension of claim 1 wherein the first pivot surface comprises at least one upper tab with an extension that operates as a shock deflection limiter.

10. The head suspension of claim 1 wherein the hinge structure comprises a pair of lateral extensions on the rigid region forming the second pivot surfaces.

11. The head suspension of claim 1 wherein the hinge structure comprises a pair of upper tabs and lower tabs on the rigid region forming the second pivot surfaces.

12. The head suspension of claim 11 wherein the second pivot surface comprises a general "V" shape.

13. The head suspension of claim 1 wherein the hinge structure comprises a pair of notches formed in proximal ends of rails extending along edges of the rigid region.

14. The head suspension of claim 1 wherein the first pivot surface comprises a horizontal edge on the base plate and the second pivot surface comprises a vertical edge with a notch on the rigid region.

15. The head suspension of claim 1 wherein the tether and the rigid region comprise separate pieces of material.

16. The head suspension of claim 1 wherein the tether and the mounting region comprise separate pieces of material.

17. The head suspension of claim 1 wherein the tether comprises a portion of the material comprising the rigid region.

18. The head suspension of claim 1 wherein the tether comprises a portion of the material comprising the mounting region.

19. The head suspension of claim 1 comprising one or more bends in the tether that generates a biasing force between the first and second pivot surfaces.

20. The head suspension of claim 1 wherein the tether comprises a member mechanically coupling the mounting region to the rigid region.

21. The head suspension of claim 1 wherein the tether comprises a member mechanically coupled to the rigid region.

22. The head suspension of claim 1 wherein the torsional spring comprises a nested configuration.

23. The head suspension of claim 1 wherein the torsional spring comprises a linear configuration.

24. The head suspension of claim 1 wherein the torsional spring comprises a serpentine configuration.

25. The head suspension of claim 1 wherein the hinge structure comprises an axis of rotation adjacent to the torsional spring.

26. The head suspension of claim 1 wherein the hinge structure comprises an axis of rotation extending through an operating region of the torsional spring.

27. The head suspension of claim 1 wherein the hinge structure comprises an axis of rotation located between the torsional spring and the rigid region.

28. The head suspension of claim 1 wherein the hinge structure comprises an axis of rotation located between the torsional spring and the base plate.

29. A head suspension assembly for a rigid disk drive comprising:

a load beam having a mounting region at a proximal end, a rigid region at a distal end and a tether connecting the mounting region and the rigid region;

a hinge structure located between the rigid region and the mounting region, the hinge structure comprising an interface with first pivot surfaces on the mounting region positively engaged with second pivot surfaces on the rigid region by the tether; and a torsional spring located between the rigid region and the mounting region.

* * * * *